United States Patent
Kluth et al.

(10) Patent No.: US 6,532,839 B1
(45) Date of Patent: *Mar. 18, 2003

(54) APPARATUS FOR THE REMOTE MEASUREMENT OF PHYSICAL PARAMETERS

(75) Inventors: Erhard Luther Edgar Kluth, Hampshire (GB); Malcolm Paul Varnham, Hampshire (GB)

(73) Assignee: Sensor Dynamics Ltd., Southampton (GB)

( * ) Notice: Subject to any disclaimer, the term of this patent is extended or adjusted under 35 U.S.C. 154(b) by 0 days.

This patent is subject to a terminal disclaimer.

(21) Appl. No.: 09/432,495

(22) Filed: Nov. 2, 1999

Related U.S. Application Data

(63) Continuation-in-part of application No. 08/824,527, filed on Mar. 26, 1997, now Pat. No. 5,992,250.

(30) Foreign Application Priority Data

Mar. 29, 1996 (GB) .............................................. 9606673

(51) Int. Cl.⁷ .............................................. G01M 19/00
(52) U.S. Cl. .................... 73/866.5; 73/152.61; 166/385; 356/375
(58) Field of Search .............................. 73/866.5, 865.8, 73/152.61; 250/227.11; 385/12; 340/854.9, 855.1, 855.2; 254/134.4, 134.3 FT; 356/375; 166/385

(56) References Cited

U.S. PATENT DOCUMENTS 3,051,038 A  *  4/1962 Duke ..................... 340/855.9
3,612,487 A     10/1971 Raney et al. ........... 254/174 R (List continued on next page.)

FOREIGN PATENT DOCUMENTS

| EP | 0 108 590 A1 |   | 4/1984  | ............ G02B/5/16 |
|----|--------------|---|---------|------------------------|
| GB | 2179471 A    |   | 3/1987  |                        |
| GB | 2284257 A    | * | 5/1995  | .......... G01N/21/00  |
| JP | 59-24607     | * | 2/1980  | ................. 324/220 |
| JP | 57-160057    | * | 10/1982 | ................. 73/49.5 |
| JP | 61-756       | * | 1/1986  | ................. 73/592 |
| JP | 63-191058    |   | 8/1988  | ................ 73/866.5 |
| JP | 63-305242    | * | 12/1988 | ................. 324/220 |
| JP | 4-357427     | * | 12/1992 | ................. 356/45 |
| WO | WO 92/17927  |   | 10/1992 |                        |
| WO | WO 96/09461  |   | 3/1996  |                        |

OTHER PUBLICATIONS

Patent Abstracts of Japan Grp P008, vol. 4, No. 55, Abs pub date Apr. 24, 1980, (55–24607), Hiroshi Kouno, et al, "Tube Inside Flaw Detector".

Patent Abstracts of Japan, Grp P165. vol. 6, No. 265, Abs Pub. Date. Dec. 24, 1982 (57–160057) Hideji Uematsu, "Pipe Body Inspection Device".

(List continued on next page.)

Primary Examiner—Thomas P. Noland
(74) Attorney, Agent, or Firm—John S. Reid

(57) ABSTRACT

Methods and apparatus for the remote measurement of physical parameters are described. The apparatus includes a sensor, sensor instrumentation, a carbon coated optical fiber cable for extending between the sensor and the sensor instrumentation, a conduit for extending to a measurement location and configured to accommodate the optical fiber cable and the sensor, and a cable installing device configured to install the sensor and the optical fiber cable through the conduit and place the sensor at the measurement location. The cable installation device includes an apparatus for propelling a fluid along the conduit, such as a pump, a compressor, and the like. In the method, a sensor is installed at a measurement location by pumping the sensor and a carbon-coated optical fiber cable through a conduit, forming a seal around the cable where it enters the conduit, and connecting the cable to sensor instrumentation.

5 Claims, 12 Drawing Sheets

U.S. PATENT DOCUMENTS

| | | |
|---|---|---|
| 4,644,791 A | 2/1987 | Sonoda et al. ...... 254/134.3 FT |
| 4,690,006 A | 9/1987 | Urata .......................... 73/866.5 |
| 4,854,614 A | 8/1989 | Torichigai et al. ............. 285/93 |
| 4,872,347 A | 10/1989 | Okabe et al. .................. 73/634 |
| 4,876,539 A * | 10/1989 | Farque ......................... 356/44 |
| 4,934,662 A | 6/1990 | Grifioen ................... 254/134.4 |
| 5,163,321 A | 11/1992 | Perales ................... 374/137 X |
| 5,199,689 A | 4/1993 | Proud et al. ............. 254/134.4 |
| 5,467,968 A | 11/1995 | Proud et al. ............. 254/134.4 |
| 5,474,227 A | 12/1995 | Krengel et al. ............. 228/147 |
| 5,474,277 A | 12/1995 | Griffoen ................... 254/134.4 |
| 5,503,370 A | 4/1996 | Newman et al. ..... 254/134.3 FT |
| 5,570,437 A | 10/1996 | Kluth ........................... 385/12 |
| 5,582,064 A | 12/1996 | Kluth ................... 73/152.51 X |
| 5,612,499 A | 3/1997 | Andrew et al. ............ 73/866.5 |
| 5,699,996 A | 12/1997 | Boyle et al. ........ 254/134.3 FT |
| 6,022,421 A * | 2/2000 | Bath et al. ...................... 134/8 |

OTHER PUBLICATIONS

Patent Abstracts of Japan, Grp P460, vol. 10, No. 147, Abs Pub. Date May 29, 1996, (61–756), Keiichi Iwamoto, et al., "Ultrasonic Flaw Inspection for Pipe".

Patent Abstracts of Japan, Grp P852, vol. 13, No. 138, Abs Pub. Date Apr. 6, 1989, 63–305242, Yasuharu Hosohara, et al, "Apparatus for Inspecting Corrosion in Outer Surface of Pipe Body".

S. A. Cassidy and M. H. Reeve, A Radically New Approach To The Installation Of Optical fibre Using The Viscous Flow Of Air, International Wire & Cable Symposium Proceesings 1983, pp. 250–254. Month not given.

* cited by examiner

APPARATUS FOR THE REMOTE MEASUREMENT OF PHYSICAL PARAMETERS

CROSS REFERENCE TO RELATED APPLICATIONS

This application is a continuation-in-part of U.S. patent application Ser. No. 08/824,527 filed Mar. 26, 1997, and now U.S. Pat No. 5,992, 250 which clams priority to foreign U.S. patent application Ser. No. 9606673.3, filed in the United Kingdom on Mar. 29, 1996.

FIELD OF THE INVENTION

The invention relates to apparatus for the remote measurement of physical parameters in which the advantages of optical fibre cables and optical fibre sensors are exploited for use within the oil industry. The invention has important applications for monitoring oil and gas reservoirs, for stack monitoring and monitoring within refineries.

BACKGROUND OF THE INVENTION

As oil and gas reserves have been consumed over the years, the extraction of the oil and gas has become increasingly more difficult under more demanding conditions. Accordingly, there is a need for the reserves to be monitored to a higher quality than hitherto. The potential payback is reducing operating costs and increasing the yield from individual reservoirs. The invention also impacts on operational and environmental safety.

There is a growing recognition that continuous dynamic sampling of downhole conditions within oil wells can generate dynamic data streams that can be processed and turned into valuable new information. Modern computer aided visualisation techniques make it much easier for production and reservoir management teams to detect and interpret changes in wellbore conditions, near-wellbore conditions and even changes in the reservoir further away from the immediate wellbore. This information can be fed back into computer models of the reservoir that are used to simulate the oil production system. These reservoir models include geologic data, seismic data, and assumptions based on past logging and exploration activity and shut-in tests on wells. By expanding the number of parameters that are sampled and by increasing the frequency of sampling, the model can be improved to reveal finer details of the reservoir properties. The benefits of this improved information are that asset managers are better positioned to anticipate degradation in the well structure, to anticipate water and gas coning and to identify regions of the reservoir where oil is left behind.

GB-A-2284257 relates to apparatus for the remote measurement of physical parameters. Experience over many installations has shown that the technique is not always reliable especially when deploying optical fibre sensors through steel hydraulic control lines in oil wells where the steel hydraulic control lines contain many bends and curves. The problem is that optical fibre cables can become stalled in the control line which can lead to tangling and possible destruction of the optical fibre cable in the hydraulic control line.

An aim of the present invention is to improve on known apparatus by improving the reliability of the apparatus needed to install and retrieve an optical fibre sensor for the measurement of physical parameters.

According to a non-limiting embodiment of the present invention, there is provided apparatus for the remote measurement of physical parameters, which apparatus comprises a sensor for sensing one or more physical parameters, sensor instrumentation for interrogating the sensor and making a measurement, a cable for extending between the sensor and the sensor instrumentation, a conduit for extending to a measurement location and which is of such a cross-sectional size that it is able to accept the cable and the sensor, and cable installation means for installing the sensor and the cable through the conduit and for placing the sensor at the measurement location, the cable installation means being such that it includes means for propelling a fluid along the conduit, and the conduit being such that it preferably contains a lead-section for providing sufficient fluid drag on the cable as it enters the conduit from the cable installation means to ensure that the sensor is able to be transported through the conduit. The means for propelling the fluid along the conduit can include any such known apparatus, as for example a pump, a venturi, gravity, and a compressor.

The sensor can be one or more optical fibre sensors. These optical fibre sensors can be sensors for measuring temperature, distributed temperature, pressure, acoustic energy, electric current, magnetic field, electric field, or a combination thereof.

The sensor can be a flow sensor based on combining the outputs from more than one sensor and applying an algorithm to estimate flow.

The sensor can be an array of optical fibre sensors configured on the same optical fibre. The array of optical fibre sensors can include a plurality of optical fibre Bragg gratings each returning a signal whose wavelength varies with applied temperature, pressure or strain. The array of optical fibre sensors can be interrogated by time division multiplexing, wavelength division multiplexing or a combination of time division multiplexing and wavelength division multiplexing.

The array of optical fibre sensors can include a plurality of optical fibre interferometers constructed from pairs of optical fibre Bragg gratings where each optical fibre Bragg grating within any pair of optical fibre Bragg gratings reflects light at substantially the same wavelength. The array of optical fibre sensors can be interrogated using time division multiplexing, wavelength division multiplexing, coherent division multiplexing or a combination of all three multiplexing techniques.

The sensor can be a distributed sensor, wherein the distributed sensor provides more than one measurement along its length. The distributed sensor can be a distributed temperature sensor, a distributed pressure sensor or a distributed strain sensor. The distributed sensor can be a distributed optical fibre sensor based on the measurement of a combination of Raleigh scattering, Raman scattering or Brillouin scattering.

Examples of sensor instrumentation include the DTS 80 (the distributed sensor readout system manufactured by York Sensors), instrumentation for measuring the strain on an optical fibre Bragg grating, an optical interferometer measurement system for measuring acoustic energy, a polarimetric sensor measurement system, or a Brillouin scattering measurement read out system, or any other appropriate sensor instrumentation system as is described in many of the conferences on optical fibre sensor systems worldwide.

The cable can be one or more optical fibre cables, and is preferably a carbon coated optical fiber.

The means for propelling a fluid can be a hydraulic pump.

The means for propelling a fluid can be a gas bottle or a compressor.

The conduit can be high-pressure tubing with an inside diameter and pressure rating to make it suitable for deploying sensors to remote locations.

The conduit can be steel hydraulic control line commonly used in the oil and gas industry having an external diameter of ⅛" to ¾" (3 mm to 19 mm). Alternatively, the conduit can be coiled tubing commonly used in the oil and gas industry having an external diameter of ¾" to 2" (19 mm to 50 mm) or greater.

The conduit can have a cross-sectional size that it is able to accept one or more cables and one or more sensors.

A pressure communication port can be connected to the conduit in order to communicate pressure from outside the conduit to a pressure sensor within the conduit. The pressure communication port can be an orifice or a valve.

A plurality of pressure communication ports can be connected to the conduit in order to communicate pressure from outside the conduit to either a single pressure sensor, a plurality of pressure sensors or to a distributed pressure sensor within the conduit. It can be desirable that flow of fluids within the conduit is prevented during pressure measurements. This can be achieved by sealing sections of the conduit or by controlling the plurality of pressure communication ports such that only one of the plurality of pressure communication ports is open at any one time.

The conduit can be a compound structure that includes an external wall of a rigid nature but with perforations that allow fluid pressure communication and an inner lining that is flexible and capable of accurately transmitting the external fluid pressure to the fluid inside the conduit. The external wall of this compound conduit has to be able to withstand operational pressures. The internal lining must be able to resist extrusion through the perforation under the operational pressures. The perforations are preferably carefully designed to minimise the risk of extrusion.

When a lead-in section is used, it should be long enough and straight enough so that fluid flow is sufficient to cause the cable and sensor to be propelled into and continue to be propelled into the conduit while the fluid is flowing, without causing the cable to stall in the lead-in section.

The lead-in section preferably does not contain substantial bends having bend radii less than 100 times the internal cross-sectional radius of the lead-in section.

The lead-in section preferably does not contain bends which cause the cable, when tensioned in the conduit to engage multiple surfaces of the conduit and in which at least two of these surfaces are separated by a distance less than 10 times the internal cross-sectional diameter of the conduit.

The lead-in section is preferably a substantially straight section of tubing which is at least 2 meters long. The tubing can be a straight section of the conduit.

The lead-in section is preferably of such a design that if the conduit is detached from the lead-in section, and transport of the cable through the lead-in section commenced using the cable installation means, then the cable will continue to be transported through the lead-in section if a tensile load of up to 1 Newton is applied to the cable at the exit of the lead-in section for more than one minute, and where the cable will start to transport again if the motion of the cable is stalled at the exit of the lead-in section for more than two seconds.

The sensor instrumentation need not be connected to the sensor while the sensor is transported through the conduit to the measurement location. In many instances it is preferable to remove the cable installation means and the lead-in section once the sensor is located at the measurement location, to form a seal around the cable where it enters or exits from the conduit, and then to connect the cable to the sensor instrumentation with a separate cable specially designed for surface cabling.

The invention also provides a method of installing a sensor at a measurement location comprising the steps of pumping the sensor and a cable through a conduit, forming a seal around the cable where it enters the conduit, and connecting the cable to the sensor instrumentation.

The sensor can be an optical fibre sensor which is connected to the cable. Alternatively, the sensor can be a micromachined sensor which is connected to a cable.

The cable can be one or more optical fibre cables. These can be hermetically sealed with carbon coating, can have high-temperature coatings such as polyimide, or silicone or polytetrafluoroethelene, metals such as nickel or indium or aluminium, or can have combinations of these coatings.

The conduit can be installed such that it extends to the measurement location prior to pumping the sensor and the cable through the conduit. In some instances, it can be preferable to pump the sensor and the cable through the conduit, and then to place the conduit such that the sensor is located at the measurement location.

An example is where the sensor and cable is pumped into the conduit and then the conduit is subsequently lowered into an oil well in order to take a measurement. The conduit can then be removed from the oil well and lowered into one or more oil wells to repeat the measurement. It will be appreciated that it can be preferable to weight the conduit prior to lowering it into the oil well. The conduit when inserted into the oil well can be configured as a single channel from the surface into the oil well, or can be configured such that it extends into the oil well and then returns back to the surface again.

The sensor can be an optical fibre sensor which is connected to the cable. Alternatively, the sensor can be a micromachined sensor which is connected to a cable.

The cable can be one or more optical fibre cable. These can be hermetically sealed with carbon coating, can have high-temperature coatings such as polyimide, or silicone or polytetrafluoroethelene, metals such as nickel or indium or aluminium, or can have combinations of these coatings.

In a first embodiment of the invention, there is provided apparatus for the remote measurement of physical parameters, in which the cable installation means includes a lead element attached to the sensor which ensures that the lead element is always able to contribute a net propelling force to avoid the sensor from stalling or to overcome a temporary stalling of the sensor while the fluid is flowing along the conduit. This is particularly advantageous when the sensor element is relatively stiff and cannot reliably circumvent bends in the conduit without touching the side walls of the conduit.

The fluid can be water or an organic liquid such as glycol or an oil. The fluid can be a silicone oil or polysiloxane oil. The fluid can be a non-Newtonian fluid such as a fluid containing solid suspensions, a gel, or a Bingham fluid. Examples of non-Newtonian fluids are drilling muds commonly used in the oil and gas industry. The fluid can be a combination of the above fluids.

In a second embodiment of the invention, there is provided apparatus for the remote measurement of physical parameters, which apparatus includes a first port where fluid enters into the conduit, and a first orifice through which the cable is able to be progressively pulled while deploying the sensor, and in which the orifice is such that sufficient fluid flows through the conduit in order to transport the sensor to the measurement location.

The first orifice can comprise a deformable insert which can be deformed in order to provide a close fit around the cable as it is being pulled through the deformable insert. Such an arrangement is commonly referred to as a stuffing box, and is common in the oil industry in slickline operations.

The first orifice can comprise a wireline injector suitably modified for small diameter cables such as optical fibre cables. Care must be taken with such an injector not to use grease which can coat the fibre and cause it to stick to the wall of the conduit.

The first orifice can include a capillary, preferably of a material such as stainless steel, connected to the lead-in section through which the cable is able to be progressively pulled while deploying the sensor. The capillary can preferably be designed to form a close fit around the cable to prevent excessive fluid escaping through the capillary. Its entry can preferably be shaped so as not to damage the cable.

The lead-in section can include a diameter restriction in order to reduce the pressure of the fluid at the end of the capillary where the cable enters into the lead-in section. The advantage is to reduce the backward force on the cable, to increase the forward drag on the cable at the capillary exit, and to reduce fluid loss through the capillary. The diameter restriction is preferably designed with an adiabatically reducing taper followed by an adiabatically increasing taper in order to minimise the overall pressure loss in the lead-in section as measured after and before the diameter restriction means.

In a third embodiment of the invention, there is provided apparatus for the remote measurement of physical parameters, which apparatus includes an exit port at the end of the lead-in section in order to increase the rate that fluid flows in the lead-in section and thus increase the fluid drag on the cable in the lead-in section.

The exit port can include a valve which is preferably closed once the sensor has reached it.

The exit port can be configured to ensure that the fluid flowing through the exit port does not create excessive turbulence in the conduit.

In a fourth embodiment of the invention, there is provided apparatus for the remote measurement of physical parameters, which apparatus includes a first port where the fluid enters into the lead-in section, a first orifice and a second orifice through which the cable is able to be progressively pulled while deploying the sensor, and a second port for reducing the fluid flowing through the second orifice, in which the first and second orifice are configured such that sufficient fluid flows through the conduit in order to transport the sensor to the measurement location.

The second port can be connected to the means for propelling the fluid along the conduit. Such an arrangement is useful in oil well applications for reducing the risk of gases such as light hydrocarbons or hydrogen sulphide or other poisonous gases escaping from the conduit through the second orifice means.

The apparatus can include a plurality of orifices, in which each orifice contains at least one port for progressively reducing the fluid flowing through each orifice from the conduit. The fluid flowing through each port can be regulated using valves or chokes.

According to a fifth embodiment of the invention, there is provided apparatus for the remote measurement of physical parameters, which apparatus includes a first port where the fluid enters into the conduit, a first orifice through which the cable can be progressively pulled while deploying the sensor, and in which the cable installation means includes pay-out controller for controlling the rate at which the cable deploys.

The pay-out controller is preferably configured to limit the rate at which the cable is deployed, and to make the rate at which the cable is deployed independent of the fluid flow rate. It is important for reliable deployment to ensure that the rate at which the cable is deployed into the lead-in section is no greater than the rate at which the cable is being transported in subsequent sections of the conduit. Failure to observe this condition can lead to the cable "piling up" within the conduit—a condition which is difficult to cure.

In the event that the cable has been caused to pile up at a point in the conduit remote from the lead in section, it can be useful to restrain the rate at which the cable can be fed into the conduit, while increasing the fluid drag on the cable in the conduit and thereby clearing the pile up.

The pay-out controller can include a wheel assembly for progressively pulling the cable through the first orifice means.

The pay-out controller can alternatively be located on the other side of the first orifice and can limit the rate at which the cable is pulled through the first orifice.

According to a sixth embodiment of the invention, there is provided apparatus for the remote measurement of physical parameters, in which the cable installation means includes a first port where the fluid enters into the conduit, and a sealed container for holding the sensor and the cable prior to pumping the sensor to the measurement location.

The invention further includes a method and apparatus for removing an optical fiber and an optical fiber sensor from oil well, regardless of the method by which the fiber and the sensor have been deployed into the well. In the method, fluid is propelled through the conduit containing the optical fiber and the sensor using the method and apparatus described above for installing an optical fiber into a conduit to drive the fiber and the sensor out of the conduit. When the conduit is a one-way conduit having one end terminating in an opening dispose within the well, the fiber and the sensor are pumped from the conduit into the well. When the conduit is a two-way conduit having both ends terminating in openings outside of the well, the fiber and the sensor are pumped from the conduit and can be collected outside of the well.

BRIEF DESCRIPTION OF THE DRAWINGS

Embodiments of the invention will now be described solely by way of example and with reference to the accompanying drawing in which.

DETAILED DESCRIPTION OF PREFERRED EMBODIMENTS OF THE INVENTION

U.S. Pat. No. 5,199,689 to Nicholas W. Proud et al describe methods and apparatus for installing a communication cable into conduits and the like. U.S. Pat. No. 5,570,437 to E.L.E Kluth, et al, and U.S. Pat. No. 5,582,064 to Kluth describe methods and apparatus for installing an optical fiber cable and sensors into a conduit in an oil well or the like. These three patent are hereby incorporated by reference.

Figure 1:
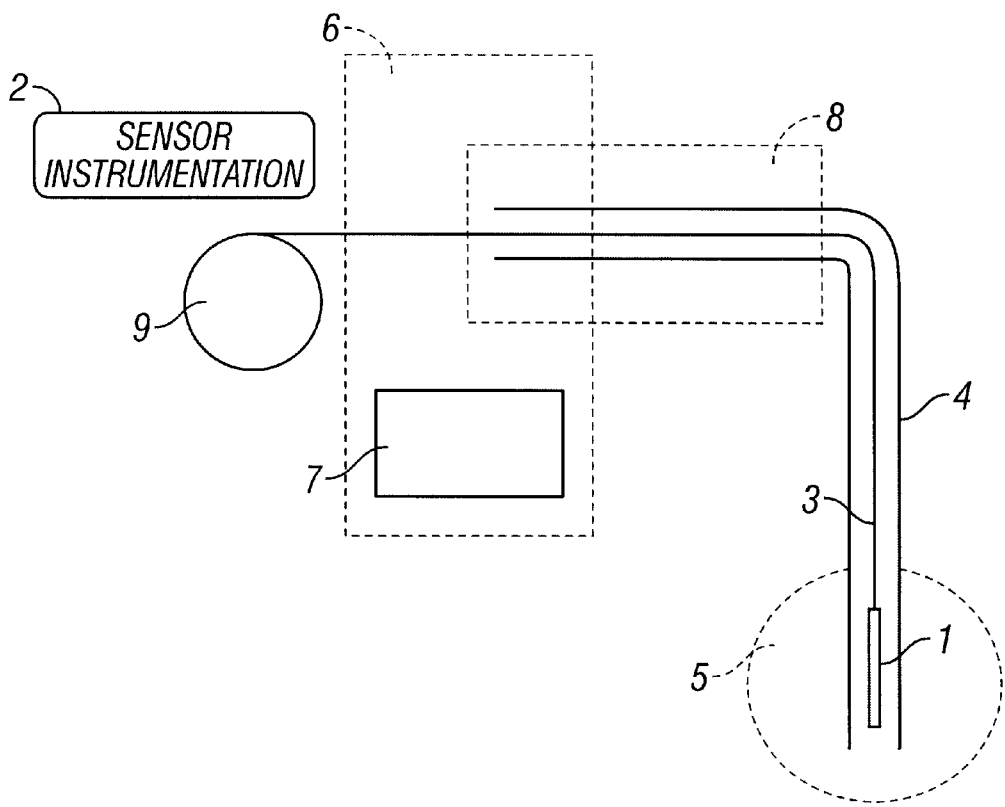
FIG. 1 is a diagram of an embodiment of the present invention.

With reference to FIG. 1, there is provided apparatus for the remote measurement of physical parameters, which apparatus comprises a sensor 1 for sensing one or more physical parameters, sensor instrumentation 2 for interrogating the sensor 1 and making a measurement, a cable 3 for extending between the sensor 1 and the sensor instrumentation 2, a conduit 4 for extending to a measurement location 5 and which is of such a cross-sectional size that it is able to accept the cable 3 and the sensor 1, and cable installation means 6 for installing the sensor 1 and the cable 3 through the conduit 4 and for placing the sensor 1 at the measurement location 5, the cable installation means 6 being such that it includes a means 7 for propelling a fluid along the conduit 4, and the conduit 4 being such that it contains a lead-in section 8 for providing sufficient fluid drag on the cable 3 as it enters the conduit 4 from the cable installation means 6 to ensure that the sensor 1 is able to be transported through the conduit 4. The cable 3 is shown wound on a drum 9 in FIG. 1. The lead-in section is not required, but is preferably employed with the apparatus.

The sensor 1 can be any sensor of a size and disposition that it can be pumped through the conduit 4. The sensor 1 can be one or more optical fibre sensors. These optical fibre sensors can include sensors for measuring temperature, distributed temperature, pressure, distributed pressure, acoustic energy, vibrational energy, strain, distributed strain, electric current, magnetic field, electric field, or a combination thereof.

The sensor instrumentation 2 can be instrumentation electronics.

The sensor instrumentation 2 can be an electro-optic electronic readout system suitable for interrogating the appropriate optical fibre sensors and can include one or more optical fibre amplifiers. For example, the electro-optic electronic readout system can be a system containing a scanned interferometer in order to read out a fibre optic pressure sensor based on a polarimetric interferometer. Alternatively it can be an instrumentation system which can determine the gap length in a pressure sensor based on an air gap interferometer. Other instrumentation can include an electro optic system for measuring the Raman scatter in single or multimode optical fibres that are now in use to determine the temperature profile along lengths of optical fibres.

The cable 3 can be one or more optical fibre cables. These can be hermetically sealed with carbon coating, can have high-temperature coatings such as polyimide, or silicone or polytetrafluoroethelene, metals such as gold, copper, silver, nickel, indium or aluminium, or can have combinations of these coatings.

The means 7 for propelling a fluid can be a hydraulic pump, a gas bottle, a gas compressor, a gas compressor linked to a container of liquid, or a combination thereof.

The fluid can be a gas such as nitrogen or methane.

The fluid can be a liquid such as water, a mixture of water and glycol (which is preferable for applications in areas where sub-zero temperatures occur frequently), a low-viscosity hydrocarbon oil, or a low-viscosity silicone or polysiloxane oil, or a perfluorocarbon fluid. Silicone or polysiloxane oils or perfluorocarbon fluids can be preferable for high-temperature applications where it is preferable to prevent water coming into contact with the cable 3. Following deployment using a fluid, the fluid can be replaced by one or more different fluids which can be preferable for the long-term preservation of the sensor 1 and the cable 3. For example, it can be convenient to use demineralised water for the deployment of the cable 3. The water can be pumped out with an alcohol (such as isopropylalcohol) in order to dry the conduit 4 out, and then the alcohol displaced with dry nitrogen or a silicone oil.

The conduit 4 can be high-pressure tubing with an inside diameter and pressure rating to make it suitable for deploying sensors to remote locations.

The conduit 4 can be steel hydraulic control line commonly used in the oil and gas industry having an external diameter of ⅛" to ¾" (3 mm to 19 mm). Alternatively, the conduit 4 can be coiled tubing commonly used in the oil and gas industry having an external diameter of ¾" to 2" (19 mm to 50 mm).

Preferably, the apparatus includes a lead-in section 8. When a lead-in section 8 is employed, it should be long enough and straight enough so that fluid flow is sufficient to cause the cable 3 and sensor 1 to be propelled into and continue to be propelled into the conduit 4 while the fluid is flowing without causing the cable 3 to stall in the lead-in section 8.

The lead-in section 8 preferably has of the same order of magnitude in internal diameter as, and more preferably approximately the same internal diameter as, the conduit 4, and preferably there is a smooth transition at the intersection between the lead-in section and the conduit 4.

The lead-in section 8 preferably does not contain substantial bends having bend radii less than 100 times the internal cross-sectional radius of the lead-in section 8. Such bends can lead to excessive frictional forces being applied to the cable 3 while the fluid is flowing leading to failure of the deployment of the sensor 1.

The lead-in section 8 preferably does not contain bends which cause the cable 3 when tensioned in the lead-in section 8 to engage multiple surfaces of the lead-in section 8 and in which at least two of these surfaces are separated by a distance less than 10 times the internal cross-sectional diameter of the lead-in section 8.

The lead-in section 8 is preferably a substantially straight section of tubing which is at least 2 meters long. The tubing can be a straight section of the conduit 4.

The lead-in section 8 is preferably of such a design that if the conduit 4 is detached from the lead-in section 8, and the transport of the cable 3 through the lead-in section 8 commenced using the cable installation means 6, then the cable 3 will continue to be transported through the lead-in section 8 if a tensile load of up to 1 Newton is applied to the cable 3 at the exit of the lead-in section 8 for more than one minute, and where the cable 3 will start to transport again if the motion of the cable 3 is stalled at the exit of the lead-in section 8 for more than two seconds. This represents a good test as to whether the design of the lead-in section 8 will provide reliable deployments of sensors and cables. A further qualification is to attach a 1 m to 5 m length of tubing of similar cross-sectional design to the conduit 4 to the lead-in section 8 where the tubing is coiled with a diameter of around 10 cm and to repeat the pulling and the stalling tests. Additional qualification would be to replicate the path which the conduit 4 would take over a length which contains the majority of the initial bends and curves in the actual installation and to repeat the pulling and the stalling tests. This is particularly advantageous prior to installing a sensor 1 through a conduit 4 in an oil well because there are often sharp bends and loops within the well head.

It is advantageous to use hydraulic control line in the lead-in section 8. It is often difficult to straighten hydraulic control line perfectly if it has been previously stored in a coiled form. The installation of the cable 3 and sensor 1 are reliable provided that the hydraulic control line is not too distorted. For example, deployments of polyimide-coated fibre cables joined to optical fibre sensors can be achieved reliably through ¼" (6 mm) hydraulic control line when bends and kinks have been reduced such that the optical fibre cables do not press against the side walls of the hydraulic control line along a 100 mm length of the hydraulic control line when the optical fibre cable is held straight. The fluid is preferably water and the fluid flow rate is preferably around 0.5 to 2 litres per minute.

The sensor instrumentation 2 need not be connected to the sensor 1 while the sensor 1 is pumped through the conduit 4 to the measurement location 5. In many instances it is preferable to remove the cable installation means 6 and the lead-in section 8 once the sensor 1 is located at the measurement location 5, form a seal around the cable 3 where it enters or exits from the conduit 4, and then connect the cable 3 to the sensor instrumentation 2 with a separate cable specially designed for surface cabling.

In some instances, it can be preferable to pump the sensor 1 and the cable 3 through the conduit 4, and then to place the conduit 4 such that the sensor 1 is located at the measurement location 5. An example is where the sensor 1 and cable 3 is pumped into the conduit 4 (which can be hydraulic control line or coiled tubing) which is then subsequently lowered into an oil well in order to take a measurement. The conduit 4 can then be removed from the oil well and lowered into one or more oil wells to repeat the measurement. It will be appreciated that it can be preferable to weight the conduit 4 prior to lowering it into the oil well. The conduit 4 when inserted into the oil well can be configured as a single channel from the surface into the oil well, or can be configured such that it extends into the oil well and then returns back to the surface again.

Figure 2:
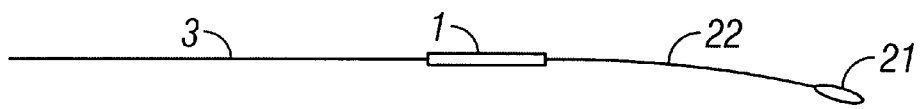
FIG. 2 is a diagram of an embodiment of the present invention in which the sensor includes a lead element.
Figure 3:
FIG. 3 is a diagram of an embodiment of the present invention in which the sensor includes a lead element.

FIG. 2 shows an embodiment of the invention, in which the cable installation means 6 includes a lead element 21 attached to the sensor 1 by a second cable 22 which ensures that the lead element 21 is always able to contribute a net propelling force to avoid the sensor 1 from stalling or to overcome a temporary stalling of the sensor 1 while the fluid is flowing along the conduit 4. This is particularly advantageous when the sensing element 1 is relatively stiff and causes significant friction as it circumvents bends in the conduit 4. The lead element 21 can either be attached to the sensor 1 by the second cable 22, or be attached directly to the sensor 1 as shown in FIG. 3.

The lead element 21 can be a pig, a piston, a drone or a parachute. The lead element 21 is preferably designed to prevent it from stalling against the side wall of the conduit 4 where the conduit 4 is bent. Such a design helps prevent a common failure in deploying sensors through hydraulic control lines containing bends and loops. Where bends and loops are encountered, there is a tendency for the leading section of the sensor 1 or cable 3 to stop temporarily while the cable 3 following is still deploying. The consequence is that the cable 3 spirals around the side wall of the conduit 4, a situation which can be non-recoverable. Designs of the lead element 21 which keep the leading section off the side walls of the conduit 4 help prevent this failure mechanism. A more preferable solution is to design the conduit 4 to avoid sharp bends wherever possible, but this can not always be possible in some well heads in use in the oil industry. There can also be other reasons for designing in a certain number of loops in the path of the conduit 4. Some of these reasons bear on increasing the spatial resolution of temperature profile measurements and on limiting the build up of stress along a very long conduit 4. The lead element 21 can also be a long length of flexible optical fiber.

Figure 4:
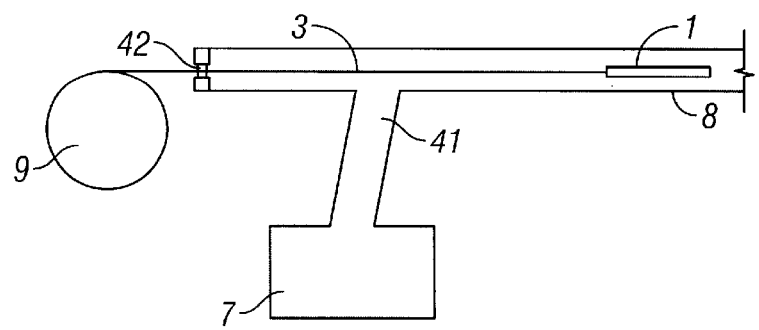
FIG. 4 is a diagram of an embodiment of the present invention in which the apparatus includes a first port and a first orifice.

FIG. 4 shows an embodiment of the invention, where the apparatus includes a first port 41 where the fluid enters into the lead-in section 8, and a first orifice 42 through which the cable 3 can be progressively pulled while deploying the sensor 1, where the first orifice 42 is such that sufficient fluid flows through the conduit 4 in order to transport the sensor 1 to the measurement location 5.

In order for the cable 3 to be pulled through the orifice 42, it is necessary to overcome opposing forces including the repelling force from the pressure differential from inside the lead-in in section 8 to the ambient pressure, any frictional forces of the cable 3 against the first orifice 42 or any fluid drag due to fluid exiting through the orifice 42. These opposing forces are not excessive for thin fibre optic cables such as polyimide-coated optical fibre having an outer diameter of approximately 150 um. Nevertheless, the length of the lead-in section 8 typically needs to be greater than around 5 meters and needs to be free of rapid undulations. Such rapid undulations can cause the optical fibre to press against the wall of the lead-in section 8 inducing friction and also reducing the fluid drag on the optical fibre. This embodiment is suitable for deploying sensors through lengths of hydraulic control line in excess of 100 m. It should be noted that if applications require a longer length of the hydraulic control line, then the applied pressure needs to be increased to maintain the fluid flow rate through the conduit 4. Consequently the repelling forces increase, and it is preferable to increase the length of the leadin section 8 to compensate. An alternative way of overcoming the increase in these repelling forces is to decrease the internal diameter of at least part of the lead-in section 8.

Figure 5:
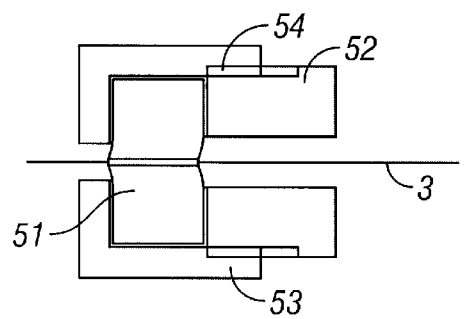
FIG. 5 is a diagram of an embodiment of the present invention in which the first orifice is a stuffing box.

The first orifice 42 can comprise a deformable insert 51 as shown in FIG. 5 which can be deformed in order to provide a close fit around the cable 3 as it is being pulled through the deformable insert 51. The deformable insert 51 is typically deformed by squeezing it between first metal plate 52 and second metal plate 53 connected by a screw thread 54. Such an arrangement is commonly referred to as a stuffing box, and is common in the oil industry in slickline operations. The first orifice 42 can also comprise a wireline injector suitably modified for small diameter cables such as coated optical fibres.

Figure 6:
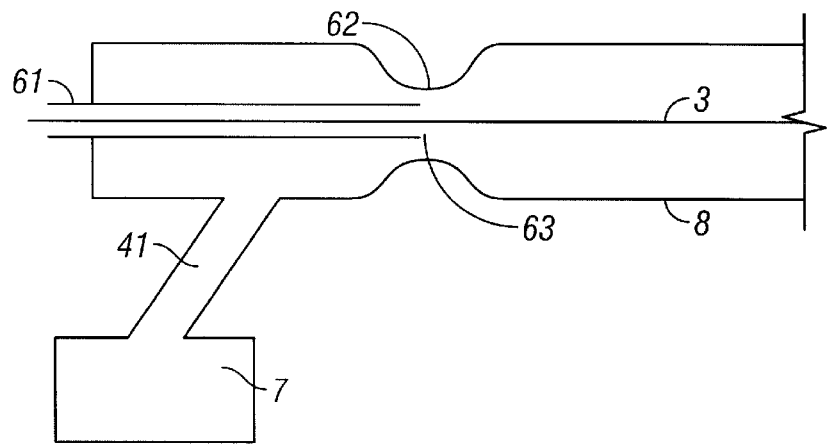
FIG. 6 is a diagram of an embodiment of the present invention in which the first orifice includes a capillary.

The first orifice 42 can also be a capillary 61, as shown in FIG. 6, which is connected to the conduit 4 through which the cable 3 can be progressively pulled while deploying the sensor 1. The capillary 61 can preferably be designed to form a close fit around the cable 3 to prevent excessive fluid escaping through the capillary 61 while the sensor 1 is being deployed. The entry into the capillary 61 can preferably be shaped so as not to damage the cable 3. Such an embodiment relaxes the length requirement on the lead-in section 8. The straight section needs to be greater than around 4 meters for deploying typical optical fibre cables through ¼" (6 mm) hydraulic control line with flow rates of around 0.5 to 2 litres per minute.

FIG. 6 also shows a diameter restriction 62 in the lead-in section 8 in order to reduce the pressure of the fluid at the end of the capillary 61 where the cable 3 enters into the lead-in section 8. The advantage is to reduce the backward force on the cable 3, to increase the forward drag on the cable 3 at the exit 63 of the capillary 61, and to reduce fluid loss through the capillary 61. The diameter restriction 62 is preferably designed with an adiabatically reducing taper followed by an adiabatically increasing taper in order to minimise the overall pressure loss in the lead-in section 8 as measured after and before the diameter restriction 62.

Figure 7:
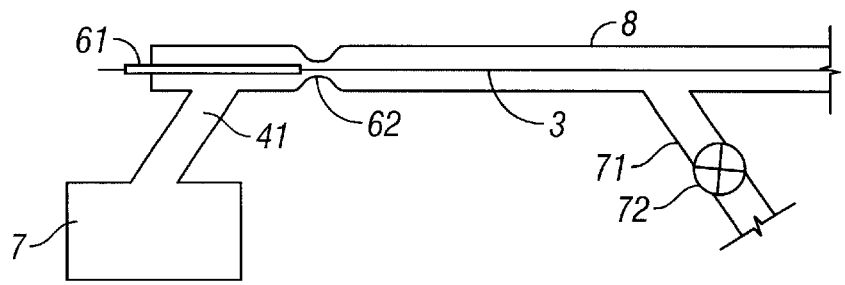
FIG. 7 is a diagram of an embodiment of the present invention in which the apparatus includes an exit port at the end of the lead-in section.

FIG. 7 shows an embodiment of the invention, where the apparatus includes an exit port 71 at the end of the lead-in section 8 in order to increase the rate that fluid flows in the lead-in section 8 (for a set flow rate in the main conduit path leading to the measurement locations) and thus increase the fluid drag on the cable 3. This has the advantage of relaxing the length requirement on the lead-in section 8.

The exit port 71 can include a valve 72 which is preferably closed once the sensor 1 has been positioned at the measurement location. The exit port 71 is preferably designed to ensure that the fluid flowing through the exit port 71 does not create excessive turbulence in the conduit 4.

Figure 8:
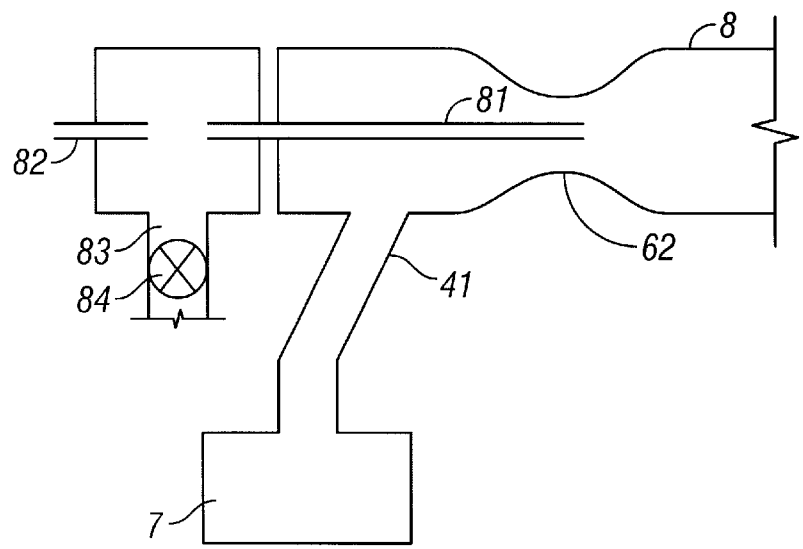
FIG. 8 is a diagram of an embodiment of the present invention in which the apparatus 12 includes a first and a second orifice.

FIG. 8 shows an embodiment of the invention wherein the apparatus includes a first port 41 where the fluid enters into the lead-in section 8 and a first and second orifice 81 and 82 through which the cable 3 can be progressively pulled while deploying the sensor 1, where the design of the first and second orifice 81 and 82 is such that sufficient fluid flows through the conduit 4 in order to transport the sensor 1 to the measurement location 5. A second port 83 is shown between the first and second orifice 81 and 82 for reducing the fluid flowing from the lead-in section 8 through the second orifice 82 while the sensor 1 is transported to the measurement location 5. The fluid flowing through the second port 83 can be controlled using a valve 84 or a choke.

Figure 9:
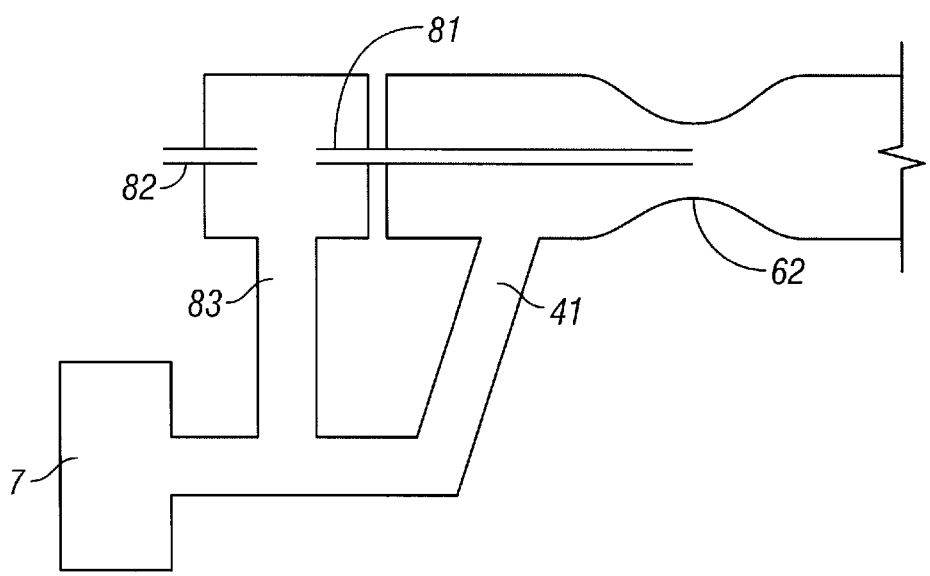
FIG. 9 is a diagram of an embodiment of the present invention in which the apparatus includes a second port.

The second port 83 can be connected to the means 7 for propelling the fluid along the conduit 4 as shown in FIG. 9. Such an arrangement is useful in oil well applications for reducing the risk of gases such as light hydrocarbons or hydrogen sulphide or other poisonous gases escaping from the conduit 4 through the second orifice 82.

The apparatus can include a plurality of orifices 82 and in which each orifice 82 contains at least one port 83 for progressively reducing the fluid flowing through each orifice 82 from the lead-in section 8. The fluid flowing through each port 83 can be regulated using a plurality of valves 84. In this instance, the design of the lead-in section 8 is preferably similar to that described for FIG. 6.

Figure 10:
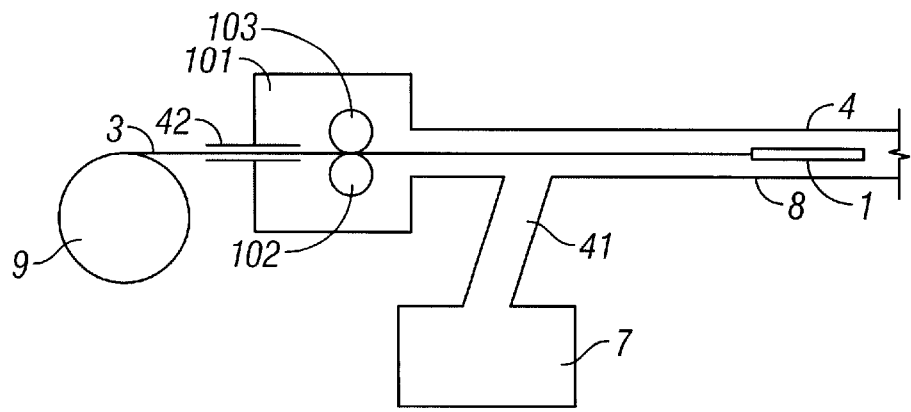
FIG. 10 is a diagram of an embodiment of the present invention in which the apparatus includes a pay-out controller.

FIG. 10 shows an embodiment of the invention, where the apparatus includes a first port 41 where the fluid enters into the lead-in section 8, a first orifice 42 through which the cable 3 can be progressively pulled while deploying the sensor 1, and where the cable installation means includes a pay out means 101 for controlling the rate at which the cable 3 deploys. The pay out means 101 can comprise a powered wheel 102 and a wheel 103 which grips the cable 3 and pulls it through the orifice 42. The pay out means 101 is preferably controlled to limit the rate at which the cable 3 is deployed, and to make the rate at which the cable 3 is deployed independent of the fluid flow rate. This embodiment has the advantage that the wheels 102, 103 overcome the opposing forces in the orifice 42. It is therefore possible to relax the length requirement on the lead-in section 8. The lead-in section 8 should preferably be straight and should preferably be longer than 3 m.

Moreover, it is possible to deploy sensors through longer lengths of hydraulic control line than is possible in the embodiments described in FIGS. 2 to 9. We have demonstrated deploying sensors through 10,000 psi (69 MPa) rated ¼" (6 mm) hydraulic control line, using water as the propelling fluid, with a pressure drop per unit length as low as 0.3 psi/m (2kPa/m). This extrapolates to a deployment distance through the conduit 4 of 30 km being achievable with this embodiment.

Figure 11:
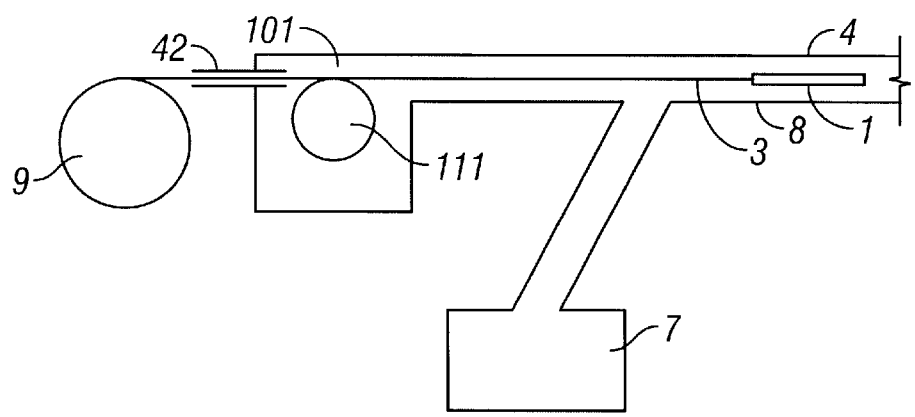
FIG. 11 is a diagram of an embodiment of the present invention in which the apparatus includes a pay-out controller.

FIG. 11 shows a preferred embodiment of the pay out means 101 which comprises a wheel 111 powered by a motor (not shown) around which the cable 3 is wrapped. The advantage of this approach is that the cable 3 will only be pulled through the first orifice means 42 if the cable 3 is tensioned by the fluid flowing in the conduit 4. Thus if the demand for cable 3 to be deployed stops temporarily the friction of the cable 3 on the wheel 111 will reduce significantly and the cable 3 will stop being pulled through the orifice means 42. It should be noted here that deployment will only start again if the lead-in section 8 is sufficiently straight and long that sufficient tension can be induced in the cable within the lead-in section 8 by fluid drag such that the cable 3 will grip the wheel 111 again. If it is found that the lead-in section 8 is not sufficiently long and the deployment has stalled, then it is often possible to restart deployment by pulsing the pressure of the fluid in the conduit 4, or by preventing further deployment of the cable 3 over the wheel 111 and increasing or pulsing the flow of fluid through the conduit 4.

By way of example, the fluid can be water and the first orifice 42 can be a steel capillary, 20 mm long and can have an internal diameter of around 0.5 mm to 1 mm, an arrangement which prevents excessive loss of fluid through the capillary and allows deployment over many kilometres of ¼" hydraulic steel tubing and 800 um outer diameter optical fibre. This implementation is attractive for deploying an optical fibre such as used for measuring temperature profiles with a distributed temperature sensor such as the York DTS 80 manufactured by York Sensors Ltd in England. Such an installation can be conducted by having the optical fibre wound in a container such as a spool or bobbin, winding it around the wheel 111, feeding a two metre length of fibre into the hydraulic steel tubing through the capillary, turning on a water pump to drive water through the conduit 4 via the first port 41 (for example a T-piece), and driving the wheel 111 to pull fibre off the bobbin as the fibre is deployed through the hydraulic tubing. The cable installation means 6 can be removed taking care not to damage the optical fibre, and the optical fibre can be interfaced to the sensor instrumentation 2 which in this instance is the York DTS80. It can be convenient to seal the hydraulic tubing around the optical fibre in order to prevent fluid loss. In practice it is preferable to keep the first metre or two of the hydraulic tubing following first port 41 as straight as possible.

Figure 12:
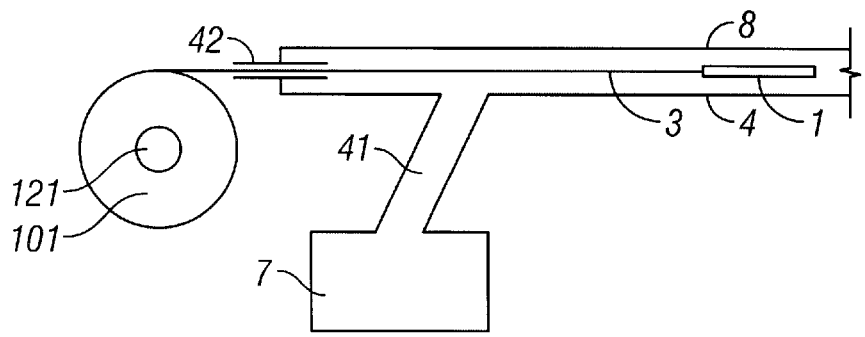
FIG. 12 is a diagram of an embodiment of the present invention in which the pay-out controller is not immersed in the fluid.

The pay out means 101 can alternatively be located the other side of the first orifice 42 as shown in FIG. 12. Here the pay out means 101 comprises a drum 121 whose speed can be controlled by a motor (not shown). The rate of deployment can also be limited by a brake mechanism, a friction mechanism, or can be simply controlled by the operator placing his hand on the drum 121 to prevent the cable 3 and sensor 1 from deploying too quickly.

Figure 13:
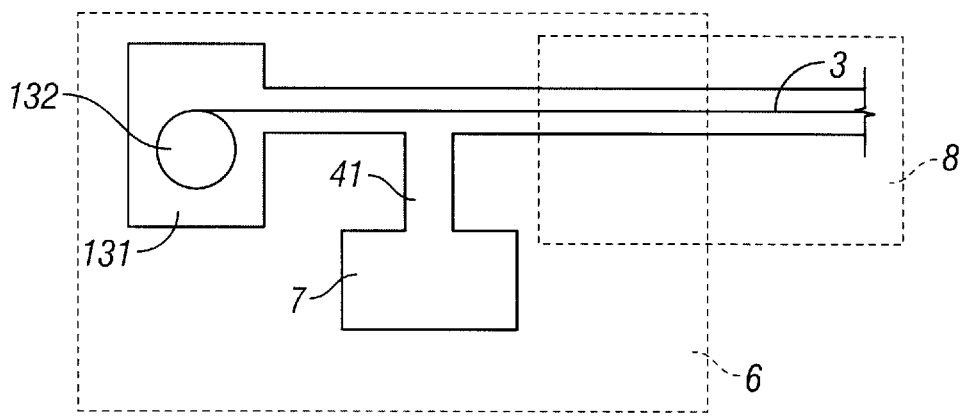
FIG. 13 shows apparatus including a sealed container.

FIG. 13 shows an embodiment of the invention where the cable installation means 6 includes a first port 41 where the fluid enters into the conduit 4, and a sealed container 131 for holding the sensor 1 and the cable 3 prior to pumping the sensor 1 to the measurement location 5. The cable 3 is held on a cable holder 132 prior to deployment except for a short length of cable 3 which is introduced into the lead-in section 8 prior to pumping the fluid. This embodiment is preferred for deploying sensors into high-pressure oil or gas wells, or subsea oil and gas wells.

The cable holder 132 can be a rotating cable drum holder which rotates as the cable 3 is pulled off it. The end of the cable 3 which is not being deployed through the conduit 4 can be connected to the sensor instrumentation 2 (not shown) through a high-pressure, fibre-optic rotary joint such as a Model 145 manufactured by Focal Technologies of Nova Scotia, Canada. This can be advantageous if it is desired to monitor the deployment of the sensor 1 and the cable 3 by, for example, time domain reflectometry.

Optical time domain reflectometry can be used to monitor the deployment of optical fibre cable because of the increased attenuation of the optical fibre cable on the rotating cable drum. The lower attenuation of the optical fibre cable which has been dispensed off the cable holder 132 can be very noticeable, particularly for multimode optical fibre or monomode optical fibre operating in a regime where bend losses are noticeable. (These bend losses would also be noticeable in the embodiment shown in FIG. 11 where the fibre cable is wrapped around the wheel 111.)

The cable holder 132 can be connected to a brake mechanism (not shown) in order to restrain the cable 3 as it is transported through the conduit 4. The brake mechanism can comprise magnets acting on a copper disk to induce eddy currents and thereby provide resistance to the cable 3 as it is being deployed.

The brake mechanism can be driven by an external motor (not shown) coupled to the cable holder 132 via a high-pressure bearing or via a magnetic clutch. It is preferable that the motor is configured to provide constant torque (and not constant velocity) on the cable 3 as it is being deployed.

In less demanding situations braking can be effected manually.

The cable holder 132 can alternatively be a cassette where the cable 3 is wound either on the inside of the cassette or the outside of the cassette and the cable 3 is pulled off without rotating the cassette. Examples of such cassettes are found in wire guided missiles and torpedoes where it is important that communication through the wire is maintained after launching.

Figure 14:
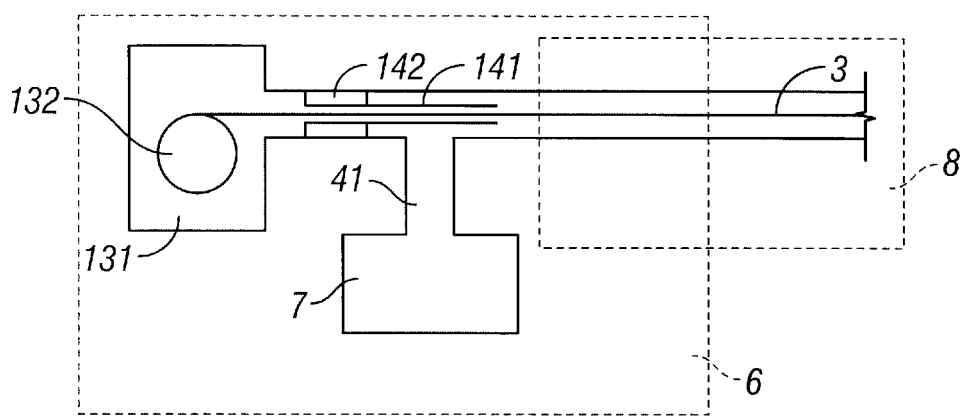
FIG. 14 shows apparatus including a sealed container and a capillary.

The cable installation means 6 can include a short length of capillary 141 as shown in FIG. 14 to provide better entrainment of the cable 3 as it enters the lead-in section 8. The capillary 141 is attached to the conduit 4 by means 142. This has the dual advantages of avoiding turbulence effects where the propelling fluid first enters the conduit 4 and also reducing fluid drag effects which oppose deployment.

Figure 15:
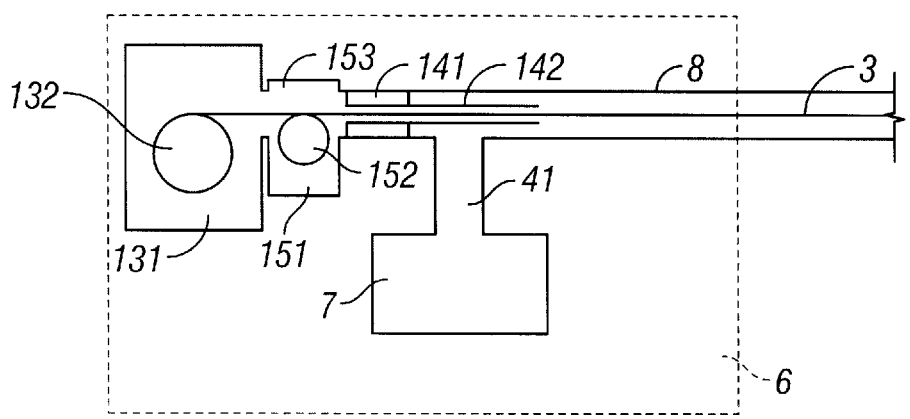
FIG. 15 shows apparatus including a sealed container and a pay-out controller.

The cable installation means 6 can also include a pay out means 151 as shown in FIG. 15 comprising a wheel assembly 152 housed in a pay out container 153. The purpose of the pay out means 151 is to control the rate at which the cable 3 enters into the lead-in section 8 independently of the fluid flow rate. The wheel assembly 152 can comprise a wheel around which the cable is wrapped. The wheel can be driven by an external motor which drives the wheel either through a high-pressure bearing or via a magnetic clutch. The friction between the wheel and the cable 3 provides the force to pull the cable 3 off the cable holder 132. This friction will only be large enough to pull the cable 3 off the cable holder 132 if sufficient drag is being induced by the fluid on the cable 3—particularly in the lead-in section 8 during the early stages of deployment. It is found that a straight lead-in section 8 of around 2 m is sufficient to ensure reliable deployment.

It will be appreciated that it is not always possible to provide enough space for a straight lead-in section 8. An alternative in these cases is to reduce the straight section to around 0.5 m in total, and to lead it very gently into a large loop containing several meters of conduit 4. If the conduit 4 is ¼" (6 mm) hydraulic control line, then the minimum bend radius should be no less than around 0.5 m—although a 1 m bend radius would be preferable. Normal plumbing practice would be to form right angle bends of around 1" (25 mm) bend radius to provide a compact installation unit. Such right angle bends placed near to the first port 41 will lead to unreliable deployment of the cable 3 and can prevent the cable 3 from deploying. It should be noted that undulations in the hydraulic control line should be straightened as much as possible. Reducing the internal diameter of a shorter lead in section 8 will also have the effect of increasing the drag on the fibre cable because the flowrate in this section will be increased.

Figure 16:
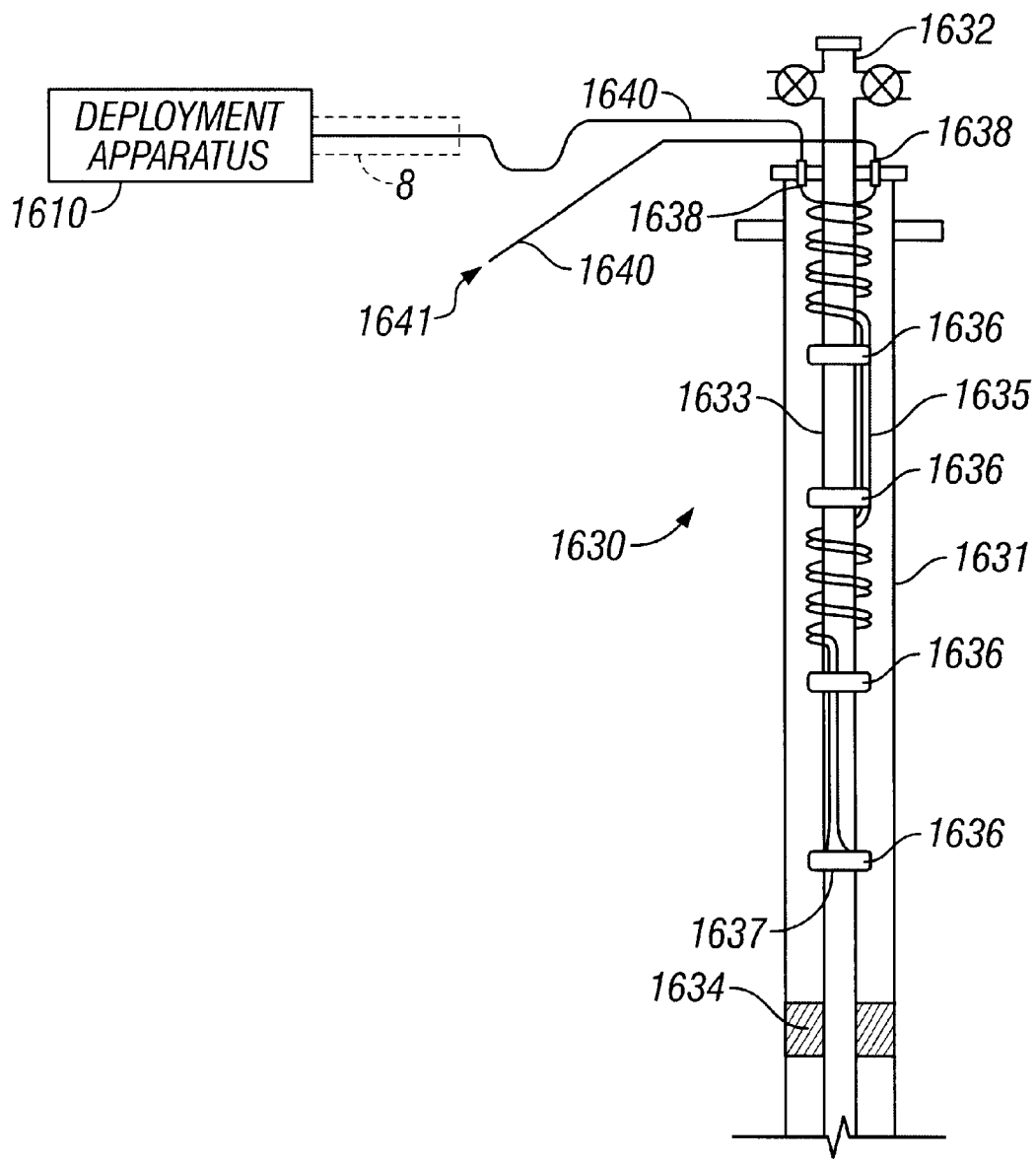
FIGS. 16 and 17 show applications of the present invention in oil wells.

FIG. 16 shows an example of how the embodiment shown in FIG. 4 can be used for deploying sensors into an oil well 1630, comprising a casing 1631, a well head 1632, a length of production tubing 1633 through which oil flows from a reservoir (not shown) to the surface, and a packer 1634 for preventing direct pressure communication between the reservoir and the wellhead via the annular space between the production string and the casing. A hydraulic control line 1635 is strapped to the production tubing 1633 using straps 1636. The hydraulic control line 1635 passes down the oil well 1630, turns around at the U-bend 1637, and passes back up the oil well again. The hydraulic control line 1635 exits the well head 1632 via ports 1638. It is usual to find that the hydraulic control line 1635 is wrapped several times around the production tubing 1633 within the well head 1632, although these wraps are not shown in FIG. 16.

Although the description referring to FIG. 16 refers to an oil well, we do not mean to restrict ourselves to oil wells. The invention applies equally well to oil wells, gas wells, geothermal wells and for wells for mining sulphur.

FIG. 16 also shows the hydraulic control line 1635 wrapped around the production tubing 1633 several times which can be advantageous for some sensing applications, for example for increasing the resolution of thermal profiling. This can be particularly important when the oil well 1630 contains an electrically submersible pump which is driven by a motor. It would be advantageous to wrap the hydraulic control line 1635 around both the pump and the motor in order to increase the effective spatial resolution of a thermal profiling sensor which can be installed into the hydraulic control line 1635 using the apparatus described in the present invention.

The deployment apparatus 1610 for installing sensors through the hydraulic control line 1635 can be one of the preceding embodiments which must be selected for its applicability. Most of these embodiments require the lead-in section 8 which is shown separately in FIG. 16. For example, if the oil well 1630 is a low-pressure oil well, and the hydraulic control line 1635 is ¼" (6 mm) steel hydraulic control line and is not too long (for example 100 m) then the embodiment shown in FIG. 4 can be used, with a lead-in section 8 of around 5 m in length—the precise figure depending on the stiffness and diameter of the cable 3. However, if the length of hydraulic control line 1635 is significantly longer (for example 3 km), then the embodiments shown in FIGS. 10 to 15 are preferred. Depending on the exact embodiment, the length of the lead-in section 8 can then be reduced to around 2 m.

It will be appreciated that if a sensor is to measure the pressure within the production tubing 1633, then it is necessary to communicate pressure from the production tubing 1633 to the hydraulic control line 1635. This can be achieved with a small orifice which would preferably contain a device to restrict the flow from the hydraulic control line 1635 to the production tubing 1633 while the sensor is being installed. Alternatively, the pressure communication can be achieved with a wireline-deployable valve such as is known in the oil and gas industry.

In use, the hydraulic control line 1635 would be installed into the oil well 1630 as the production tubing 1633 is being lowered into the ground. The installation of the oil well 1630 would then be completed and the sensors installed into the hydraulic control line 1635 at a convenient time later. This is achieved, by connecting the deployment apparatus 1610 to the oil well 1630 with external hydraulic control line 1640, and pumping the sensor through the hydraulic control line 1635 and the external hydraulic control line 1640 using fluid. The fluid can be collected at the far end 1641 by a vessel (not shown) which can be designed so that the entire deployment apparatus 1610, hydraulic control line 1635 and the external hydraulic control line 1640 is a sealed system.

If a sensor were to fail during or subsequent to its installation, it can be pumped out of the hydraulic control line 1635, the hydraulic control line 1635 cleaned (for example by pumping through solvents, a plug of wire wool or a combination of both) and a replacement sensor installed using the deployment apparatus 1610. The invention thus further includes a method and apparatus for removing an optical fiber and an optical fiber sensor from oil well, regardless of the method by which the fiber and the sensor have been deployed into the well. In the method, fluid is propelled through the conduit containing the optical fiber and the sensor using the method and apparatus described above for installing an optical fiber into a conduit to drive the fiber and the sensor out of the conduit. When the conduit is a one-way conduit having one end terminating in an opening dispose within the well, the fiber and the sensor are pumped from the conduit into the well. When the conduit is a two-way conduit having both ends terminating in openings outside of the well, the fiber and the sensor are pumped from the conduit and can be collected outside of the well. The fiber and sensor can be deployed by any of the means disclosed herein, or by other known and novel means.

Following the installation of the sensor, the external hydraulic conduit 1640 is removed taking care not to sever the fibre optic cable, and the fibre-optic cable connected to the sensor instrumentation 2 with a separate cable designed for external cabling. Alternatively, it can be convenient to form the connection to the sensor instrumentation 2 using fibre optic cable which is pumped through hydraulic control line using the deployment apparatus 1610.

In many installations, the hydraulic control line 1635 can experience high pressures subsequent to the installation of the sensor 1. In these cases, it is preferable to include a splice chamber (not shown) at or near the well head such that the cable 3 can be spliced to a high-pressure fibre optic seal which in turn is connected to the sensor instrumentation 2 via a separate cable. In order to gain access to the cable 3 for fusion splicing, it is preferable that the splice chamber is of such a diameter that it can contain several meters of fibre-optic cable. Fire-proofing safety requirements can be satisfied by separately protecting the splice chamber with an external casing. It will be appreciated that in order to gain access to the cable 3 for fusion splicing, it is necessary to isolate the well pressure. This can be achieved either by pumping a higher-density fluid into the hydraulic control line 1635 through a port (which can be provided in the splice chamber), or by forming an annular seal around the fibre inside the conduit 4 by using, for example, a valve which contains an elastic deformable element.

Figure 17:
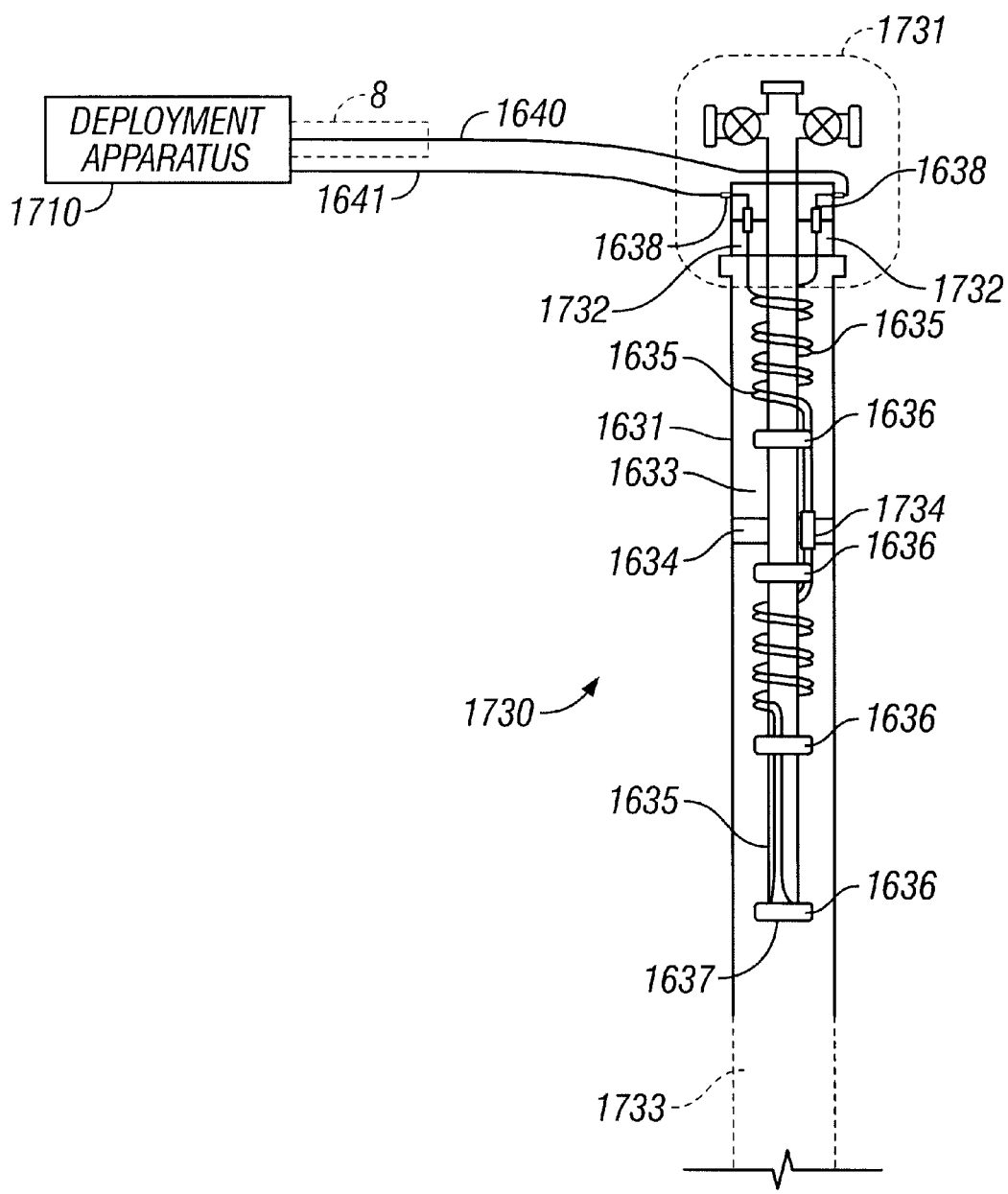

FIG. 17 shows an example of how the deployment apparatus 1710 shown in FIG. 15 can be used for deploying sensors into an oil well 1730. The lead-in section 8 is shown separately. The embodiment is particularly useful for high-pressure wells, subsea wells, or wells where the length of the hydraulic conduit 1635 is very long (greater than 1km). FIG. 17 shows the channel formed by the hydraulic conduit 1635 penetrating the packer 1634 such that a sensor 1 (not shown) can make measurements near the perforations 1733 where oil flows from the reservoir into the production tubing 1633. This is achieved using a packer penetrator 1734.

The far end 1641 of the hydraulic conduit 1640 is shown routed back to the deployment apparatus 1710 in order to form a closed system. The deployment apparatus 1710 can be located on or conveniently near the well head 1731, on a platform or on the sea bed.

The designs and procedures for installing the hydraulic conduit 1635, the clamps 1636, and the packer penetrators 1734 are known in the oil industry and are used frequently for installing control lines either for chemical injection or for the hydraulic actuation of downhole valves or mechanical actuation devices used in so-called "smart wells" which are currently being developed by several oil-field service companies. Technology also exists for drilling spurs into the formation around the oil well 1730 into which coiled tubing can be inserted. Such coiled tubing can contain the conduit 4 so that a sensor 1 can be placed to make measurements (such as acoustic, seismic, temperature or pressure) within the formation, reducing influence of the fluid flow in the production tubing 1633. Such spurs can be drilled from the well bore of the oil well, can be drilled from the surface in the vicinity of the oil well, or can be drilled remote from the oil well.

It should be noted that whereas the packer penetrator 1734 is shown penetrating the packer 1634 directly, a channel through the packer 1634 could equally bypass the packer 1634 via a sleeve which could be inserted near the packer 1634 using wireline techniques. An alternative approach would be to pump the sensor 1 through channels in the casing 1631.

The well shown has a well head 1731 similar to that used in subsea completions containing stab connectors 1732 which are mated when the well head is lowered into place. FIG. 17 also shows a packer penetrator 1734 which allows the channel formed by the hydraulic conduit 1635 to pass through the packer 1634.

Figure 18:
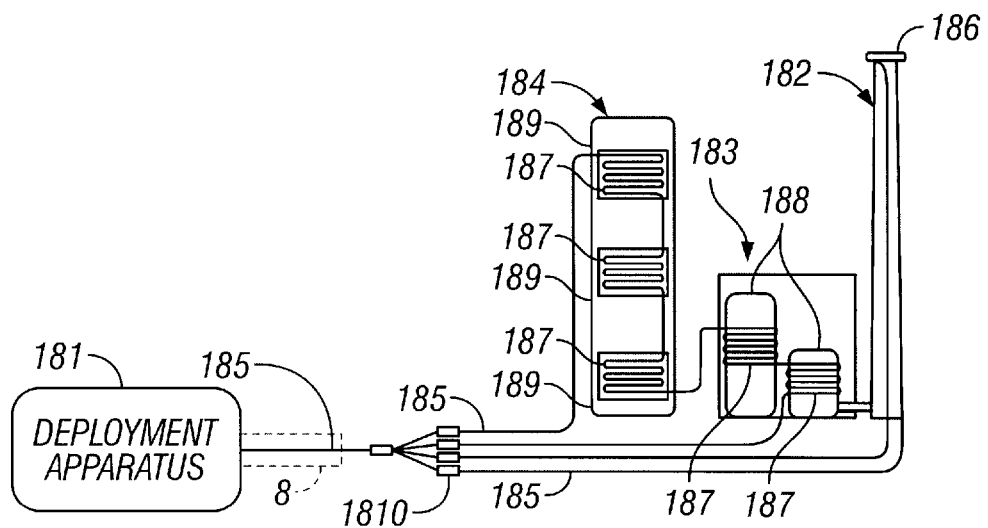
FIG. 18 shows application of the present invention in oil refineries.

The deployment apparatus 1710 would also be useful for deploying sensors into high-pressure wells, or in wells where the length of the hydraulic control line 1633 is very long (500 m to 3 km, or up to 30 km as oil-well drilling technologies improve) FIG. 18 shows how a deployment apparatus 181 can be used to pump a sensor 1 (not shown) for stack monitoring in a stack 182, for process monitoring in process plant 183, or for monitoring reactions in catalytic converters 184. Hydraulic control lines 185 are routed up the stack 182 to a measurement location 186 where an interface (not shown) to enable the sensor 1 to measure outputs from the stack 182 is required. The interface can be a thermal path for the measurement of temperature, or can include a window to enable optical or infra-red gas sensors to monitor stack emissions, or can include a sampling chamber to enable gas sensors (including non-optical) to monitor stack emissions. FIG. 18 also shows the hydraulic control line 185 being routed through process vessels 188 where it forms loops 187 in order to increase the number of points that can be sampled by the sensor 1 pumped through the hydraulic control line 185. The monitoring of catalytic converters 189 by forming loops 187 also increases the number of points that can be sampled by the sensor 1. Connectors 1810 allow the operator to select the hydraulic control line 185 through which the sensor 1 is to be deployed. The hydraulic control line 185 can be manufactured from steel, titanium, or materials which are chemically inert and can withstand high pressures.

Figure 19:
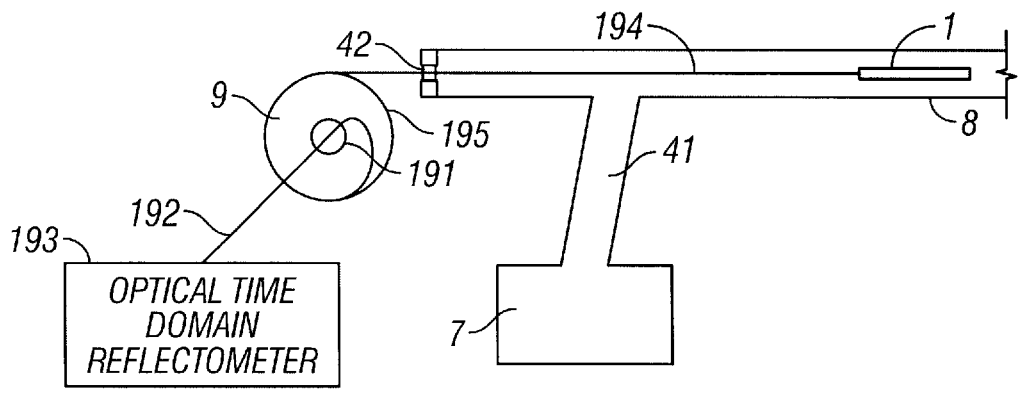
FIG. 19 shows a method for monitoring the deployment of a sensor using optical time domain reflectometry.

FIG. 19 shows an optical time domain reflectometer 193 connected to an optical fibre cable 195 wound on a drum 9 via an interconnecting cable 192 and a fibre-optical rotary joint 191 such as the Model 145 fibre-optical rotary joint manufactured by Focal Technologies of Nova Scotia, Canada. The optical time domain reflectometer 193 is used to monitor the deployment of the optical fibre cable 195 as it is deployed from the drum 9 by comparing the relative attenuation between the optical fibre cable 195 on the drum 9 and optical fibre cable 194 in the conduit.

Figure 20:
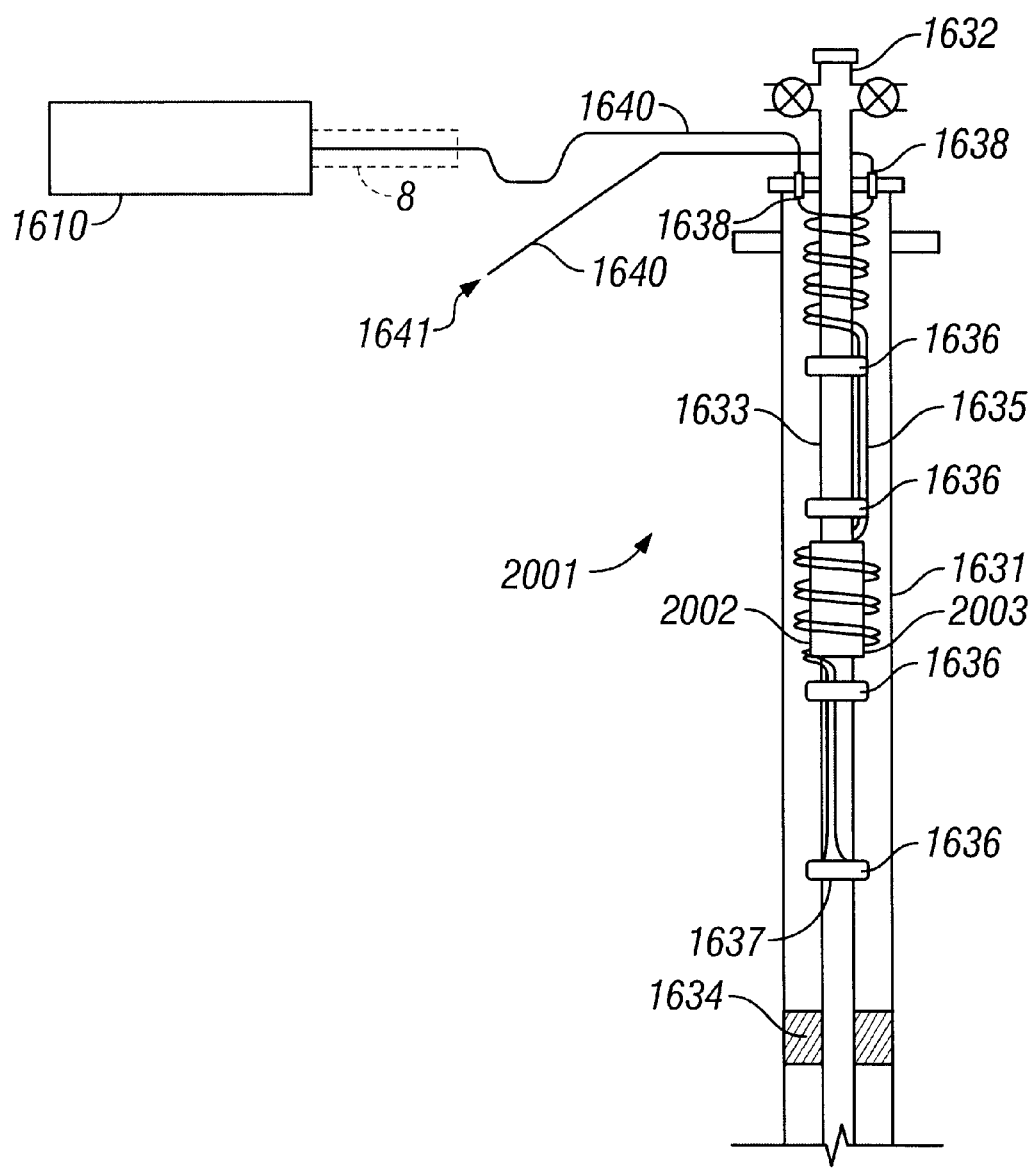
FIGS. 20 to 22 show applications of the present invention in oil wells.

FIG. 20 shows an oil well 2001 containing a downhole pump 2002 around which are several turns 2003 of the conduit 1635. The conduit 1635 contains a sensor 1 and a cable 3 as shown in FIG. 1 for monitoring the condition of the downhole pump 2002. The sensor 1 can be a temperature sensor. The sensor 1 is preferably a length of optical fibre cable configured to sense distributed temperature of the conduit 1635, the distributed temperature of the conduit proximate the downhole pump 2002 being indicative of the condition of the downhole pump 2002. Pressure, acoustic energy and vibrational energy sensors can also be included for monitoring the condition of the downhole pump 2002.

Figure 21:
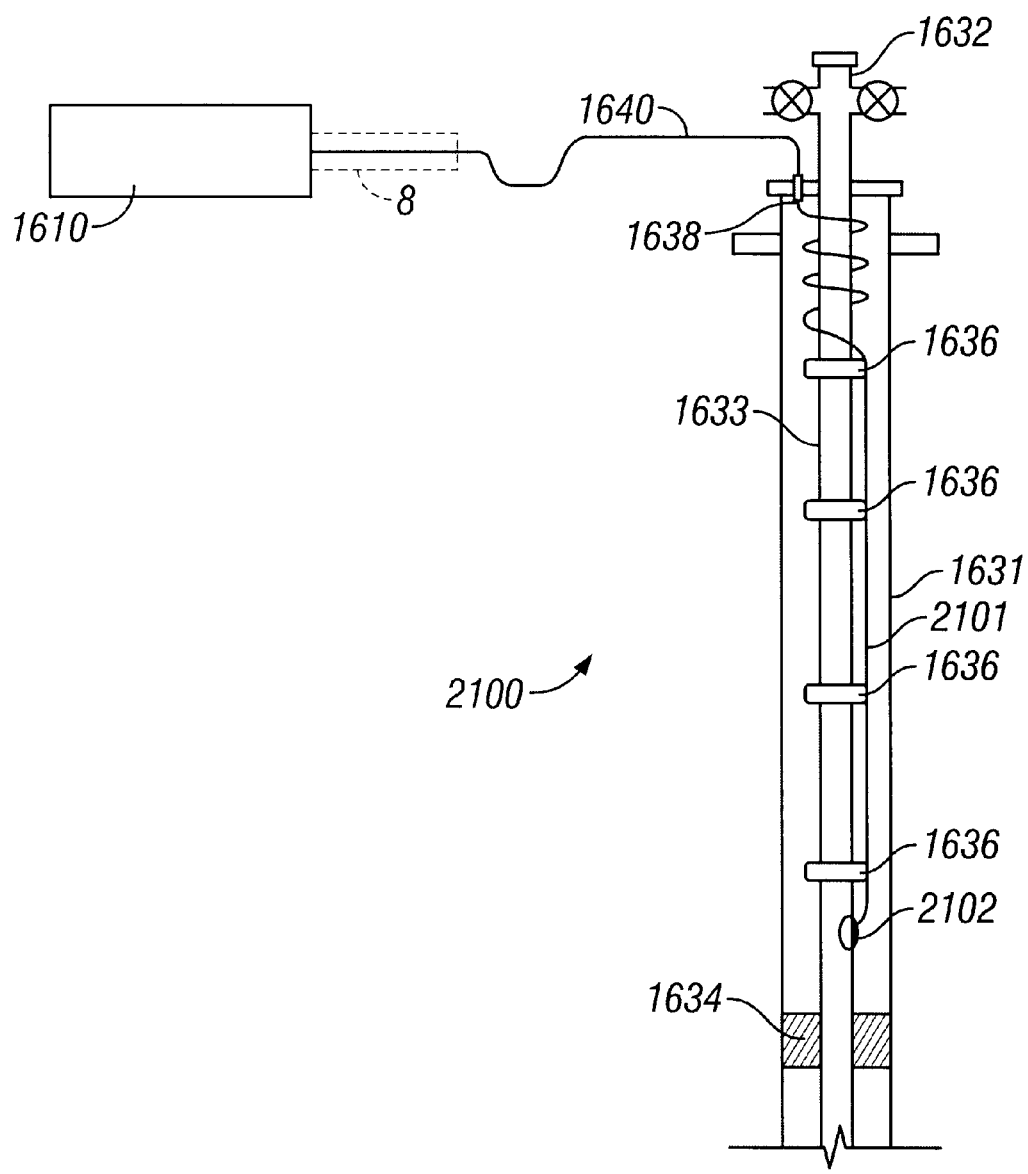

FIG. 21 shows an oil well 2100 of a similar design to FIG. 16, the conduit 1635 being replaced by a conduit 2101 that passes down the oil well 2100 to a valve 2102. The valve 2102 can be a wireline deployable valve. The sensor 1 (not shown) is deployed into the conduit 2101 using the deployment apparatus 1610 with the fluid being pumped into the production tubing 1633. The sensor 1 can be removed from the conduit 2101 by allowing fluid to pass up the conduit 1635. This can be achieved by blocking the production tubing 1633 with a plug and pumping fluid into the production tubing 1633 such that fluid flows down the production tubing 1633 and up the conduit 2101.

Figure 22:
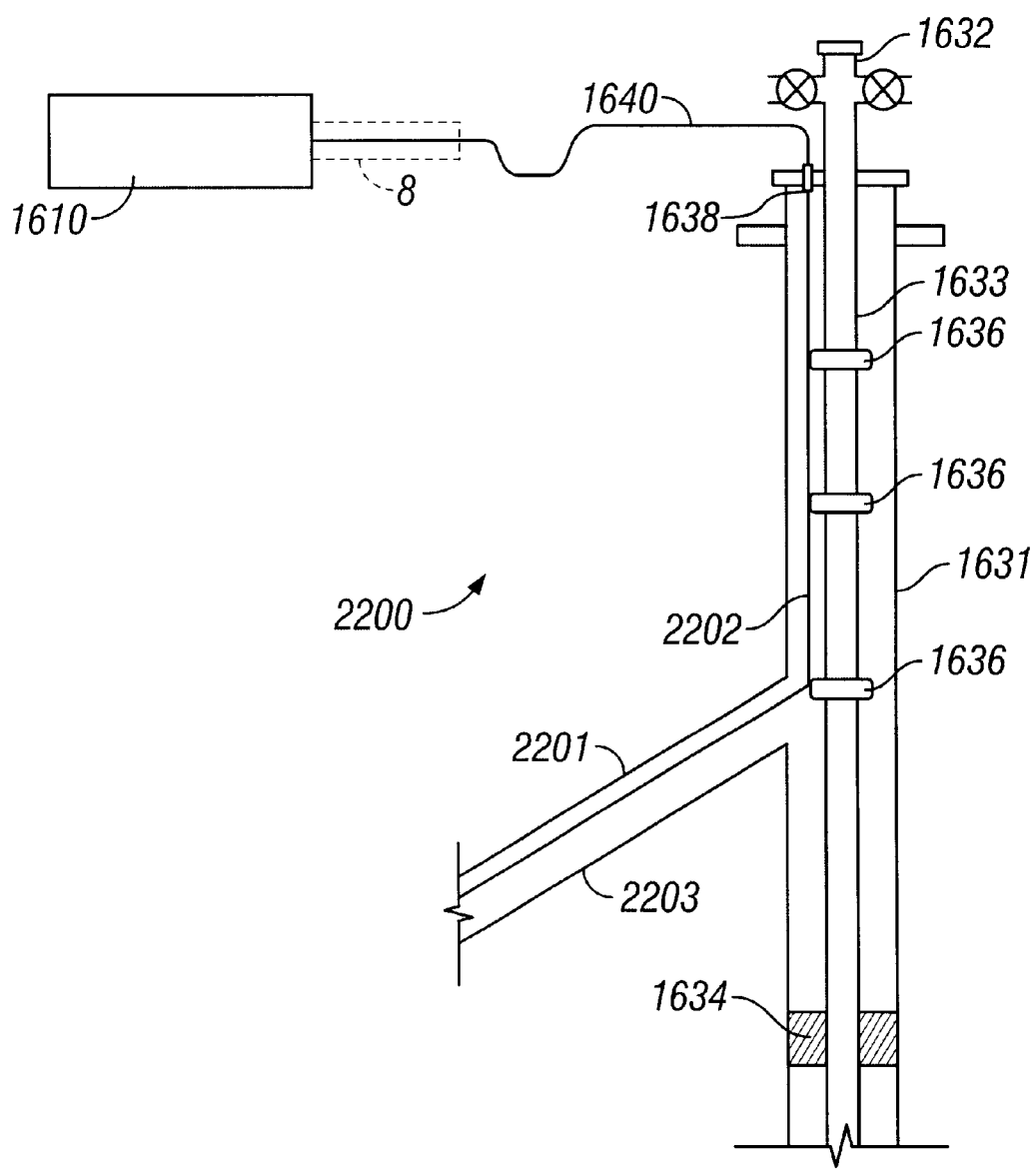

FIG. 22 shows an oil well 2200 having a spur 2201 drilled into the surrounding rock formation 2203. A conduit 2202 is placed into the spur 2201 and a sensor 1 (not shown) can be pumped into the conduit 2202 using the deployment apparatus 1610. The conduit 2202 can be coiled tubing. The conduit 2202 can also comprise coiled tubing containing an inner conduit thus providing a return path for the fluid while pumping the sensor 1.

Figure 23:
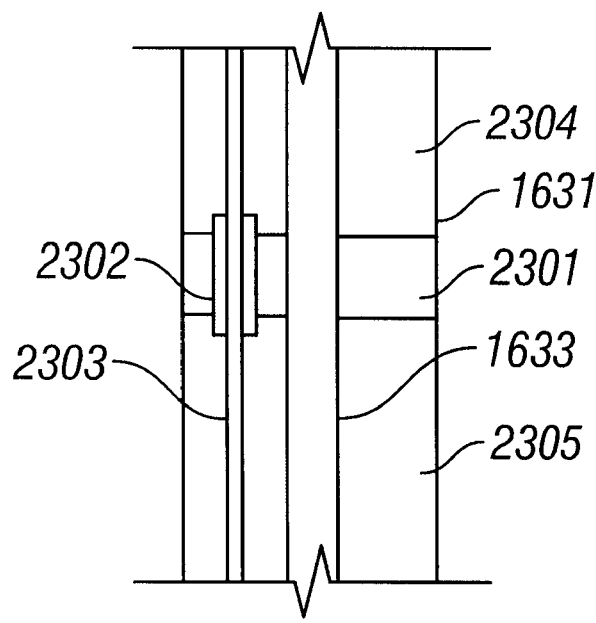
FIG. 23 shows a packer penetration in an oil well.

FIG. 23 shows a conduit 2303 passing through a packer 2301 of an oil well via a packer penetrator 2302. The packer 2303 is annularly disposed between the casing 1631 and the production tubing 1633 thus separating the oil well into an upper region 2304 and a lower region 2305. A sensor 1 can be pumped through the conduit 2303. This configuration is useful when it is required to measure physical parameters below the packer 2301 of an oil or gas well such as one of the oil wells shown in FIGS. 16, 17, 20, 21 and 22.

Figure 24:
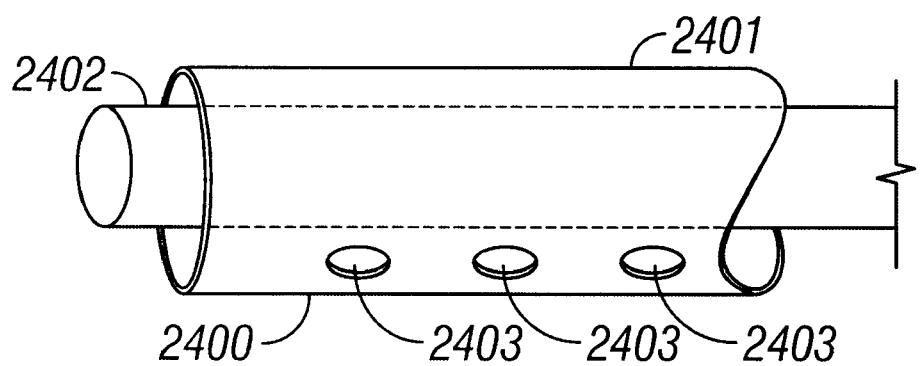
FIG. 24 shows a compound conduit structure.

FIG. 24 shows a conduit 2400 comprising an outer wall 2401 and a liner 2402 wherein the outer wall 2401 contains at least one perforation 2403 for improving the communication of hydrostatic pressure, acoustic and seismic signals from the outside of the conduit 2400 through to the inside of the conduit 2400. The outer wall 2401 is preferably rigid and can be constructed from steel or titanium. The liner 2402 is preferably flexible and can be constructed from polyurethane, PVC, a silicone rubber or another compliant material which can be strengthened with fibres such as Kevlar or an aramid yarn along its length. The material of the liner 2402 must be chosen so that small changes in pressure are transmitted accurately to fluid inside the liner 2402. The liner 2402 and the design of the perforations 2403 are preferably designed to prevent extrusion of the liner 2402 during the deployment of a sensor 1, at which time there can be significant pressure differentials across the liner 2402.

It is to be appreciated that the embodiments of the invention described above with reference to the accompanying drawings have been given by way of example only and that modifications and additional components can be provided to enhance the performance of the apparatus without deviating from the overall nature of the invention disclosed herein.

We claim:

1. An apparatus for the remote measurement of physical parameters, comprising: a sensor, sensor instrumentation, an optical fiber cable comprising a carbon coated optical fiber for extending between the sensor and the sensor instrumentation, a conduit for extending to a measurement location and configured to accommodate the optical fiber cable and the sensor, and cable installation means oonfigured to install the sensor and the optical fiber cable through the conduit and place the sensor at the measurement location, the cable installation means including means for propelling a fluid along the conduit, the conduit being such that it contains alead-in section providing sufficient fluid drag on the optical fiber cable as it enters the conduit from the cable installation means to ensure that sensor is able to be transported through the conduit, and wherein the cable installation means includes an orifice through which the optical fiber cable is able to be progressively pulled while deploying the sensor, and wherein the orifice is such that sufficient fluid flows through the conduit in order to transport the sensor.

2. The apparatus of claim 1 wherein the orifice comprises a stuffing box.

3. The apparatus of claim 1 wherein the orifice comprises a capillary.

4. The apparatus of claim 1 and further comprising an exit port at the end of the lead in section.

5. The apparatus of claim 4 wherein the exit port comprises a valve.

* * * * *